UNITED STATES PATENT OFFICE.

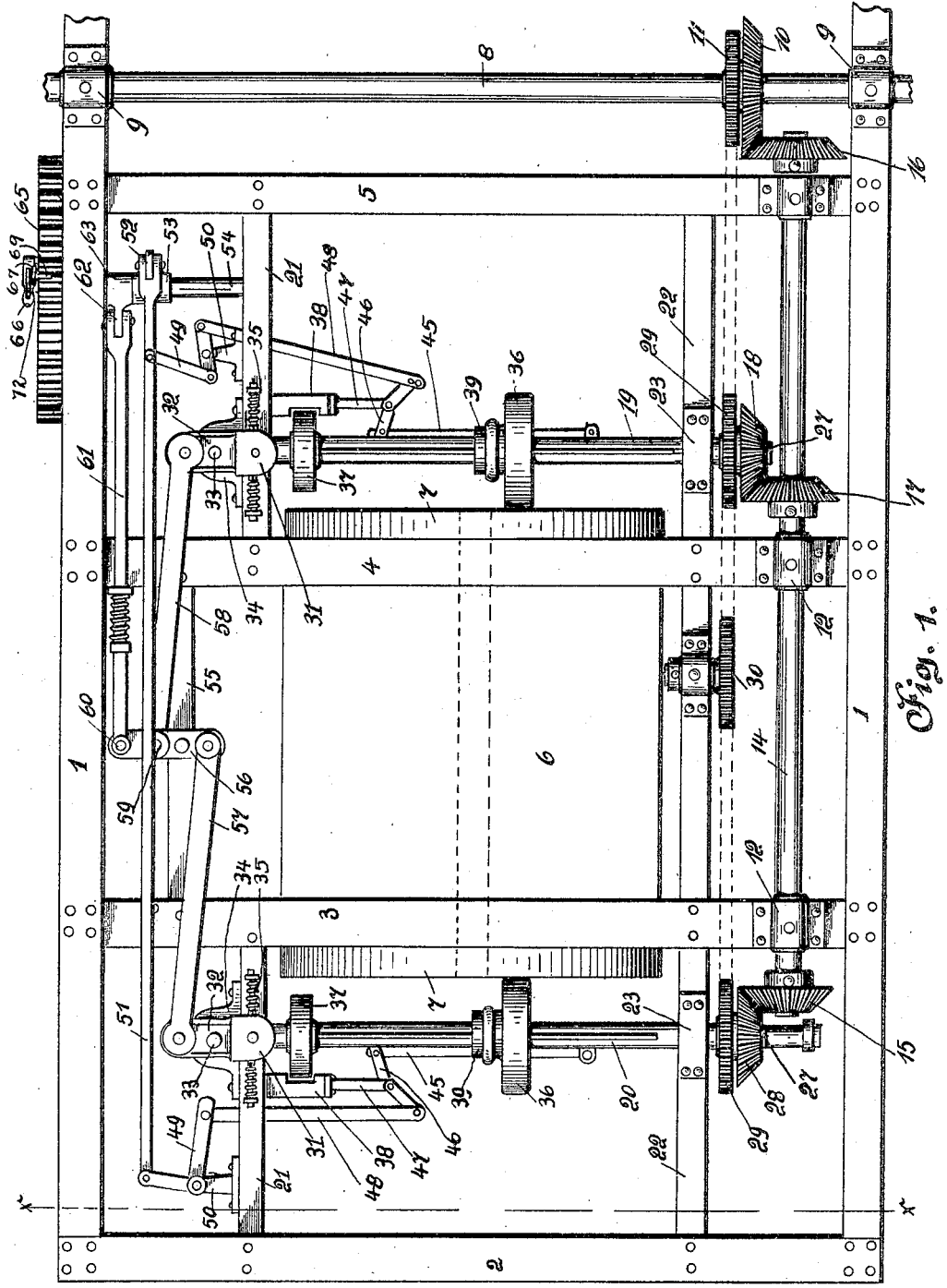

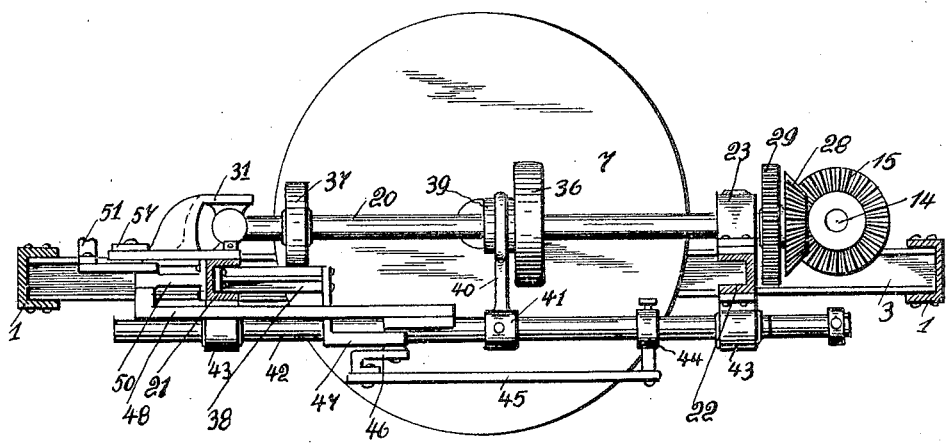
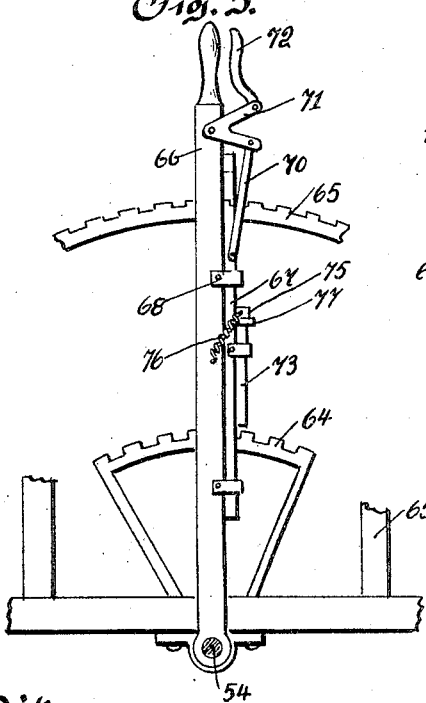
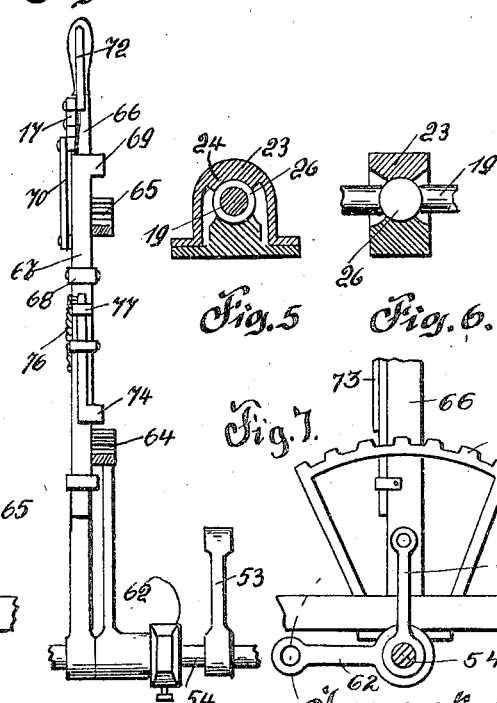

THOMAS L. MANSFIELD, OF WASHINGTON, PENNSYLVANIA.

SPEED-REGULATING DEVICE.

No. 812,579. Specification of Letters Patent. Patented Feb. 13, 1906.

Application filed January 28, 1905. Serial No. 243,054.

*To all whom it may concern:*

Be it known that I, THOMAS L. MANSFIELD, a citizen of the United States of America, residing at Washington, in the county of Washington and State of Pennsylvania, have invented certain new and useful Improvements in Speed-Regulating Devices, of which the following is a specification, reference being had therein to the accompanying drawings.

This invention relates to certain new and useful improvements in speed-regulating devices for automobiles, and has for its object the provision of novel means for governing and regulating the speed at which an automobile travels.

My invention aims to provide a novel device or mechanism which can be readily embodied in the framework and running-gear of an automobile and easily and quickly manipulated by an operator to change the speed or rapidity at which an automobile is traveling and to quickly stop the same when it is desired. In this connection the invention is primarily intended to be used as a variable speed device for automobiles, whereby when the engine of the locomotive has been placed in operation any desired speed may be obtained from said engine by regulating the mechanism. I have also provided novel means in connection with my improved device for stopping and braking the automobile when it is desired.

The invention finally consists in the novel construction, combination, and arrangement of parts, which will be hereinafter more fully described, and then specifically pointed out in the claims, and, referring to the drawings accompanying this application, like numerals of reference designate corresponding parts throughout the several views, in which—

Figure 1 is a top plan view of the framework of an automobile, showing my improved device constructed thereon. Fig. 2 is a transverse sectional view taken on the line $xx$ of Fig. 1. Fig. 3 is a detail view of the operating-levers employed in connection with my improved device. Fig. 4 is an edge view of the same. Figs. 5 and 6 are detail sectional views of a ball-and-socket joint used in connection with my improved device; and Fig. 7 is a fragmentary detail view of a portion of the devices shown in Figs. 3 and 4, taken in opposite direction to Fig. 3.

To put my invention into practice, I have employed a framework which consists of side rails 1 1, an end rail 2, and transverse frames 3, 4, and 5. This frame is substantially the shape and form of automobile-frames commonly used, and it is obvious that this frame may be constructed whereby it will be applicable to the different types of automobiles commonly used. I have employed this frame to demonstrate the practicability and arrangement of my improved device, and in this connection I have employed an engine 6, which is of a conventional form that need not be described in detail, with the exception that the operating-shaft of the engine is provided upon its ends with disks 7 7, that are employed for transmitting power to the drive-shaft or axle of the automobile.

The drive shaft or axle of my improved mechanism is designated by the reference-numeral 8, and this shaft may be mounted at any suitable place upon the framework. In the present illustration the shaft is journaled transversely of the framework in bearings 9 9, carried by the rails 1 1, and said shaft is provided with a beveled gear 10 and a sprocket-wheel 11. Upon the frames 3, 4, and 5 I secure bearings 12, in which is journaled a shaft 14. Upon the end of the shaft 14 are secured beveled gear-wheels 15 and 16, the beveled gear-wheel 16 meshing with the beveled gear 10 of the shaft 8. A beveled gear 17 is also mounted upon the shaft 14, and this beveled gear meshes with a beveled gear-wheel 18, mounted upon the end of a pivotally-mounted rotatable shaft 19. The reference-numeral 20 designates a similar shaft, and these shafts are mounted transversely of the framework upon the cross-frames 21 21 and 22. The shafts 19 and 20 are pivotally mounted in the ball-and-socket bearings 23 23, carried by the cross-frame 22.

One form of ball-and-socket bearing which I may employ is illustrated in Figs. 5 and 6 of the drawings; but I do not care to confine myself to this form, as I have simply illustrated this type of ball-and-socket bearing in order that the principle and operation of my improved device can be readily understood. In the form of ball-and-socket bearing illustrated the bearing consists of two sockets 24 24, in which are mounted balls 26, carrying the shafts 19 20. This form of bearing permits the shafts 19 and 20 to rotate, at the same time pivotally supporting said shafts. The ends 27 of said shafts protrude through the bearings 23 23, and the shaft 20 is provided with a beveled gear 28, similar to the beveled gear 18, and said beveled gear 23 is adapted to mesh with the beveled gear 15 of the shaft 14. The ends of the shafts 19 and 20 are also provided with sprocket-wheels 29 29, which aline longitudinally with the sprocket-wheel 11 of the shaft 8. An idler 30 is mounted on the cross-frame 22, and these sprocket-wheels are employed in connection with a sprocket-chain (shown in dotted lines in Fig. 1) should it be desired to transmit a rotary motion from the shafts 19 and 20 to the shaft 8. These sprocket-wheels are only intended to be used should the beveled gears of the shafts 8, 14, 19, and 20 become damaged or useless. The opposite ends of the shafts 19 and 20 are rotatably mounted in the ball-and-socket bearings 31 31, which are similar in construction to the ball-and-socket bearings 23, and therefore need not be further described. These bearings are carried by the levers 32 32, pivotally mounted, as indicated at 33, upon brackets 34 34, secured to the outer side of the cross-frames 21 21.

To retain the ball-and-socket bearings 31 31 in alinement with the ball-and-socket bearings 23 23, I have provided springs 35 35, which are mounted upon each side of the bearings 31 31, and these springs are adapted to normally retain the bearings 31 31 in the position illustrated in Fig. 1 of the drawings. Slidably keyed upon the shafts 19 and 20 are friction-wheels 36 36. These wheels are adapted to rotate with the shafts 19 and 20 and are slidably mounted thereon, whereby they can be moved to obtain any desired speed from the disks 7 7 of the engine 6. The shafts 19 and 20 are also provided with brake-wheels 37 37, which are adapted to bear against the shoe-brackets 38 38, carried by the cross-frames 21 21.

To slide or adjust the wheels 36 36 upon the shafts 19 and 20, I have provided said wheels with collars 39 39, that are connected by links 40 and collars 41 41 to rods 42 42, slidably mounted in depending bearings 43 43, carried by the cross-frames 21 21 and 22. Adjustably mounted upon the rods 42 42 are collars 44, which are connected by links 45 45 to bell-crank levers 46 46, pivotally mounted upon the arms 47 47, carried by the shoe-brackets 38 38. The opposite ends of the bell-crank levers 46 are pivotally connected to bars 48, that are connected to bell-crank levers 49, pivotally mounted in brackets 50, carried by the cross-frames 21 22. To move the bars, bell-crank levers, and rods just described, I have employed a rod 51, which extends longitudinally of the framework, and to this rod are connected the ends of the bell-crank levers 49 49. The one end of the rod 51 is connected, as indicated at 52, to a crank-arm 53, said crank-arm being adjustably mounted upon the shaft 54, journaled between the forward cross-frame 21 and the one side rail 1 of the framework. The manner of operating the mechanism just described to adjust the wheels 36 36 will be presently described.

Between the transverse frames 3 and 4 is mounted a rail 55, upon which is pivotally mounted a lever 56, the one end of which is connected by a link 57 to one of the levers 32, while the other lever 32 is pivotally connected by a link 58 to the lever 56, as indicated at 59. The end 60 of the lever 56 is connected by a rod 61 to a crank-arm 62, carried by a collar 63, mounted upon the shaft 54, the crank-arm 62 being at right angles to the crank-arm 53 and the crank-arm 53 normally extending into a vertical position, while the crank-arm 62 is in a horizontal position.

The collar 63 is rotatably mounted upon the shaft 54, and the end of this collar carries a toothed segment 64, and the side rail 1 carries a larger toothed segment 65. Upon the end of the shaft 54 is secured an operating-lever 66, and this lever carries sliding bars for engaging the toothed segments 64 and 65. The reference-numeral 67 designates one of said bars which is slidably mounted in brackets 68, carried by the levers 66, and the upper end of the bar 67 is formed with a tooth 69, that is adapted to engage in the notches formed in the segment 65. The bar 67 is connected by a link 70 to a bell-crank lever 71, pivoted to the operating-lever 66, said bell-crank lever being provided with a suitable handle 72. Slidably mounted upon the bar 67 is a substantially L-shaped bar 73, having a tooth 74, adapted to engage in the notches of the segment 64. The bar 73 is provided with a pin 75, to which is attached a spring 76, the other end of which is connected to the lever 66, and the spring is adapted to normally hold the bar 73 in engagement with the segment 64. The reference-numeral 77 designates a yoke carried by the bar 67, which is employed for raising the bar 73 when the bar 67 is actuated, said yoke 77 engaging the pin 75 during the upward movement of the bar 67 and after the tooth 69 has been disengaged from the notches in the segment 65.

Operation: We will assume that the engine 6 of the automobile is in operation, this engine being controlled by suitable valves and levers (not shown) common to automobiles. By the position of the friction-wheels 36 of my improved device the automobile on account of their engagement with the disks 7 7 is traveling at a low rate of speed, the rotary motion of the disks 7 7 being imparted to the shaft 8 through the medium of the shafts 19, 20 and 14 and beveled gear-wheels carried by said shafts. This motion may be also imparted to the shaft 8 through the medium of the sprocket-wheels and a suitable sprocket-chain carried by said shafts.

Should it be desired to change the speed of the automobile or to increase the rapidity at which it is traveling, the operating-lever 62 is grasped and the handle 72 compressed sufficiently to disengage the tooth 69 from the segment or rack 65, at which time the operating-lever 66 can be moved, which will rock the shaft 54, and through the medium of the rod 51, which now moves toward the left from the position shown in Fig. 1, bell-cranks 49 and 46, bars 48, and rods 42, and friction-wheels 36 can be moved outwardly upon the shafts 19 and 20, whereby they will engage the disks 7 7 near their periphery. The movement of the handle 72, as above described, is only made to such extent as to disengage the tooth 69 from the segment 68, but is not made far enough to cause the yoke 77 to engage the pin 75. Consequently during this operation and the movement of the operating-lever 66 the segment 64, carried by collar 63, will be moved, and this movement of the segment 64 will through the medium of the rod 61, lever 56, links 57 and 58, and pivoted levers 32 move the shafts 19 and 20 sufficiently to disengage the wheels 36 36 from contact with the disks 7 7 to permit of their being adjusted upon the shafts 19 and 20. This movement of the segment 64, owing to the fact that the crank-arm 62 is normally in alinement with the rod 61, will move the shafts 19 and 20 just a sufficient distance to permit the wheels 36 to be moved upon the shafts 19 and 20 without engaging the disks 7 7. By mounting the levers 32 32, whereby they will have sufficient leverage or throw, this movement can be regulated, whereby the disengagement of the wheels 36 36 from the disks 7 will hardly be noticeable and yet will be sufficient to permit of the adjustment of the wheels 36 to any required extent across the face of the disk 7 without engaging the wheels with the disks during such adjustment.

When the wheels 36 have been moved outwardly upon the shafts 19 and 20 the required distance, the handle 72 is compressed still further, and this further movement of the handle 72 raises the bar 67 to an additional extent, and this further movement of the bar 67 causes the yoke 77 to engage the pin 75 and to raise the bar 73, thereby disengaging the tooth 74 from the segment 64, whereupon the segment 64 and the parts connected therewith will be returned to their normal position by the resiliency of the springs 35, thus bringing the wheels 36 again into contact with the disk 7. The handle 72 is now released and the tooth 69 permitted to engage the rack 65 and the tooth 74 permitted to engage the rack 64, and the parts will thus be securely held in their proper adjusted positions. When it is desired to move the wheels 36 in a reverse direction, the handle 72 is grasped and compressed until the tooth 69 is drawn out of engagement with the rack 65 and the tooth 74 is drawn out of engagement with the rack 64. The lever 66 is then moved to a vertical position and the grasp on the handle 72 relaxed sufficiently to permit the tooth 74 to engage the rack 64. The lever 66 is then moved still further in a direction opposite to the direction of movement first above described, and this movement of the lever moves the rack 64, the collar 63, and the arm 62 in a direction opposite to that in which they were moved during the outward adjustment of the wheels 36, and as the crank-arm 62 is by this movement swung down below a horizontal line the shafts 19 and 20 will be moved outwardly, and as the movement of the crank-arm 53 is now in a direction reverse to that in which it was moved during the outward adjustment of the wheels 36 these wheels will be adjusted inwardly or toward the centers of the disks 7.

Should it be desired to entirely stop the automobile prior to stopping the engine, the handle 72 being pressed sufficient to raise the tooth 69 out of engagement with the segment 65, the lever 66 is then operated to entirely disengage the wheels 36 36 from the disks 7 7 and move the brake-wheels 37 37 into frictional engagement with the shoe-brackets 38 38, which will retard and finally stop the rotary motion of said wheel and the shafts 19 and 20.

From the foregoing description, taken in connection with the drawings, it will be observed that I have provided a novel form of mechanism for regulating and governing the speed at which an automobile can travel when equipped with my improved device, and while I have herein illustrated the preferred manner of arranging the operating mechanism it is obvious that this mechanism and its appurtenant parts can be arranged to conform to the different types of frames or running-gears of automobiles commonly used.

I also desire it to be understood that while I have illustrated this mechanism as being used in connection with an automobile I do not care to confine myself to this limitation, as the mechanism can be readily used in connection with machinery where it is desired to produce variable speeds from an engine.

It will be noted that various changes may be made in the details of construction without departing from the general spirit and scope of the invention.

What I claim, and desire to secure by Letters Patent, is—

1. In a device of the type set forth, the combination with a suitable frame, a shaft mounted in said frame, revoluble disks mounted on said shaft, rotatable pivotally-mounted shafts carried by said frame, wheels slidably mounted upon said last-named shafts, and adapted to engage said disks, means carried by said frame to adjust said wheels upon said shafts, and means carried by said frame and operable by said adjusting means to disengage said wheels from said disks, substantially as described.

2. In a device of the type described, the combination with a suitable frame, a shaft mounted on said frame, disks carried on the opposite ends of said shaft, of rotatable pivotally-mounted shafts carried by said frame, means carried by said last-named shafts to engage said disks, and impart a rotary motion to said shafts, means to adjust the first-named means and simultaneously disengage the first-named means from said disk, substantially as described.

3. In a device of the type described, the combination with a suitable frame, a shaft mounted in said frame and disks carried by said shaft, of rotatable shafts pivotally mounted upon said frame, wheels slidably mounted upon said last-named shafts and adapted to engage said disks, means to adjust said wheels upon said shafts, means to disengage said wheels from said disks, brake-wheels carried by said shafts and stationary brake-shoes adapted to coact with said brake-wheels and to retard the movement of said shafts when disengaged from said disks, substantially as described.

In testimony whereof I affix my signature in the presence of two witnesses.

THOMAS L. MANSFIELD.

Witnesses:
 O. C. NOBLE,
 W. L. MILLER.